(12) United States Patent
Fujisawa

(10) Patent No.: US 9,158,286 B2
(45) Date of Patent: *Oct. 13, 2015

(54) ELECTRONIC TIMEPIECE AND CONTROL METHOD FOR AN ELECTRONIC TIMEPIECE

(71) Applicant: Seiko Epson Corporation, Tokyo (JP)

(72) Inventor: Teruhiko Fujisawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/287,638

(22) Filed: May 27, 2014

(65) Prior Publication Data

US 2014/0269221 A1    Sep. 18, 2014

Related U.S. Application Data

(63) Continuation of application No. 13/960,179, filed on Aug. 6, 2013, which is a continuation of application No. 13/685,434, filed on Nov. 26, 2012, now Pat. No. 8,531,921, which is a continuation of application No.

(Continued)

(30) Foreign Application Priority Data

Jan. 16, 2008    (JP) .................................. 2008-007132

(51) Int. Cl.
*G04R 20/02*    (2013.01)
*G01S 19/14*    (2010.01)
*G01S 19/34*    (2010.01)
*G04G 5/00*    (2013.01)
*G04C 11/00*    (2006.01)
*G04R 20/04*    (2013.01)

(52) U.S. Cl.
CPC ................. *G04R 20/02* (2013.01); *G01S 19/14* (2013.01); *G01S 19/34* (2013.01); *G04C 11/02* (2013.01); *G04G 5/002* (2013.01); *G04R 20/04* (2013.01)

(58) Field of Classification Search
CPC ....................................................... G04R 20/02
USPC ............................................................ 368/47
See application file for complete search history.

(56) References Cited

U.S. PATENT DOCUMENTS 5,510,797 A    4/1996  Abraham et al.
5,724,316 A *  3/1998  Brunts ............................ 368/10

(Continued)

FOREIGN PATENT DOCUMENTS

DE    4202435    8/1993
JP    05-142365  6/1993

(Continued)

*Primary Examiner* — Amy Cohen Johnson
*Assistant Examiner* — Jason Collins

(57) ABSTRACT

An electronic device comprises a receiver configured to receive a satellite signal; a time generator configured to generate time; and a processor configured to selectively execute an automatic reception process or a manual reception process. The automatic reception process includes acquiring time information based on the received satellite signal and correcting the time based on the acquired time information. The automatic reception process is executed when a predetermined condition is satisfied. The manual reception process includes calculating the position of the electronic device based on satellite orbit information and the received satellite signal, and correcting the time based on the calculated position. The manual reception process is executed based on manual operation.

8 Claims, 13 Drawing Sheets

Related U.S. Application Data

13/526,890, filed on Jun. 19, 2012, now Pat. No. 8,351,301, which is a continuation of application No. 13/155,988, filed on Jun. 8, 2011, now Pat. No. 8,223,593, which is a continuation of application No. 12/351,506, filed on Jan. 9, 2009, now Pat. No. 7,983,116.

(56) References Cited

U.S. PATENT DOCUMENTS

| | | |
|---|---|---|
| 6,212,133 B1 | 4/2001 | McCoy et al. |
| 6,278,660 B1 | 8/2001 | Tognazzini |
| 6,944,540 B2 | 9/2005 | King et al. |
| 6,999,381 B2 | 2/2006 | Fujisawa et al. |
| 7,075,859 B2 | 7/2006 | Miyahara et al. |
| 7,079,451 B2 | 7/2006 | Okeya |
| 7,139,225 B2 | 11/2006 | Farmer |
| 7,190,307 B2 | 3/2007 | Gronemeyer |
| 7,307,919 B2 | 12/2007 | Fujisawa |
| 7,317,418 B2 | 1/2008 | Salkhi |
| 7,457,203 B2 | 11/2008 | Nakagawa |
| 7,760,588 B2 | 7/2010 | Takada |
| 7,983,116 B2 | 7/2011 | Fujisawa |
| 8,223,593 B2 | 7/2012 | Fujisawa |
| 8,351,301 B2 | 1/2013 | Fujisawa |
| 8,531,921 B2 | 9/2013 | Fujisawa |
| 2002/0136094 A1 | 9/2002 | Kawai |
| 2004/0037172 A1 | 2/2004 | Okeya |
| 2004/0202051 A1 | 10/2004 | Ihara |
| 2005/0157592 A1 | 7/2005 | Nakamura |
| 2006/0002238 A1 | 1/2006 | Morris |
| 2006/0023572 A1 | 2/2006 | Someya |
| 2006/0034159 A1 | 2/2006 | Sano |
| 2006/0274605 A1 | 12/2006 | Gauthey et al. |
| 2007/0210957 A1 | 9/2007 | Brodie et al. |
| 2007/0230285 A1 | 10/2007 | Nakagawa |
| 2007/0241959 A1 | 10/2007 | Nakagawa |
| 2008/0175105 A1 | 7/2008 | Urano et al. |
| 2009/0135674 A1* | 5/2009 | Matsuzaki ............... 368/14 |

FOREIGN PATENT DOCUMENTS

| | | |
|---|---|---|
| JP | 09-297171 | 11/1997 |
| JP | 09-297191 | 11/1997 |
| JP | 10-010251 | 1/1998 |
| JP | 2000-199792 | 7/2000 |
| JP | 2004-144688 | 5/2004 |
| JP | 2006-010638 | 1/2006 |
| JP | 2008-032636 | 2/2008 |
| JP | 2009-128179 A | 6/2009 |

\* cited by examiner

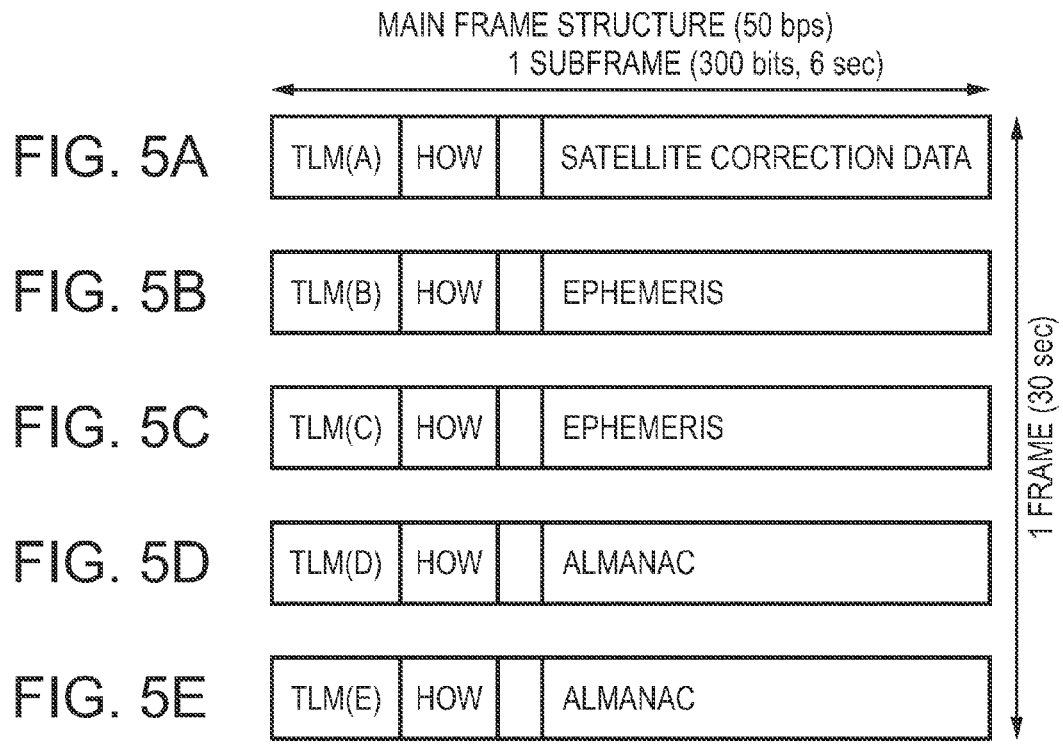
FIG. 5A
FIG. 5B
FIG. 5C
FIG. 5D
FIG. 5E
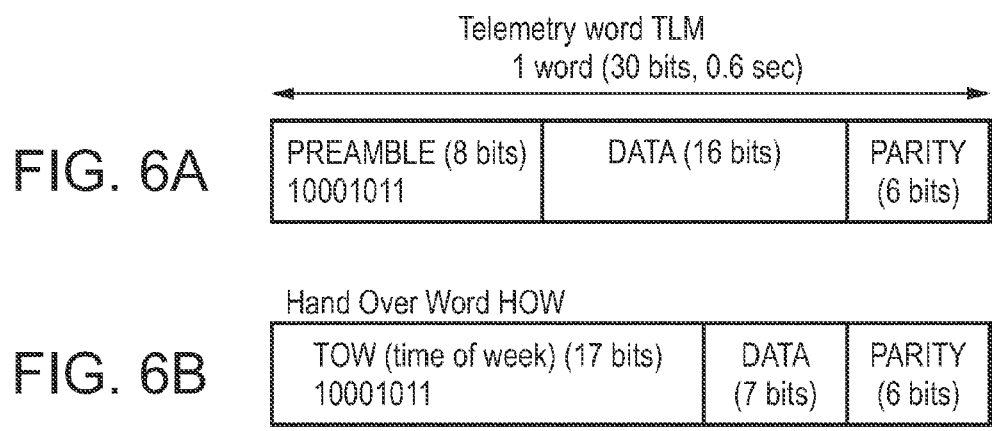
FIG. 6A
FIG. 6B

ELECTRONIC TIMEPIECE AND CONTROL METHOD FOR AN ELECTRONIC TIMEPIECE

CROSS-REFERENCES TO RELATED APPLICATIONS

This application is a continuation of, and claims priority under 35 U.S.C. §120 on, U.S. application Ser. No. 13/960,179, filed Aug. 6, 2013, which is a continuation of U.S. application Ser. No. 13/685,434, filed Nov. 26, 2012, now U.S. Pat. No. 8,531,921, which is a continuation of U.S. application Ser. No. 13/526,890, filed Jun. 19, 2002, now U.S. Pat. No. 8,351,301, which is a continuation of U.S. application Ser. No. 13/155,988, filed Jun. 8, 2011, now U.S. Pat. No. 8,223,593, which is a continuation of U.S. application Ser. No. 12/351,506, filed Jan. 9, 2009, now U.S. Pat. No. 7,983,116, which claims priority under 35 U.S.C. §119 on Japanese Patent application No. 2008-007132, filed Jan. 16, 2008. Each of the above-identified applications is hereby incorporated by reference in its entirety.

BACKGROUND

1. Field of Invention

The present invention relates to an electronic timepiece and a control method for an electronic timepiece that adjusts the time based on signals received from positioning satellites such as GPS satellites.

2. Description of Related Art

The Global Positioning System (GPS) for determining the position of a GPS receiver uses GPS satellites that circle the Earth on known orbits, and each GPS satellite has an atomic clock on board. Each GPS satellite therefore keeps the time (referred to below as the GPS time or satellite time information) with extremely high precision.

An electronic device that has a timekeeping function for adjusting the time using time information (GPS time) from GPS satellites is taught, for example, in Japanese Unexamined Patent Appl. Pub. JP-A-H09-297191.

The electronic device taught in Japanese Unexamined Patent Appl. Pub. JP-A-H09-297191 receives signals from three or more GPS satellites to determine its position and the time zone at the determined position (current location). It then calculates and displays the current time at the current location using the time difference obtained for this time zone and the reference time from an internal clock.

When the electronic device taught in Japanese Unexamined Patent Appl. Pub. JP-A-H09-297191 moves to a different time zone, it can automatically adjust the change in the time difference resulting from such movement by regularly recalculating the time based on the positioning process, such as once a day.

However, the positioning process must acquire orbit information from three or more GPS satellites, the reception process is therefore time-consuming, and power consumption increases. This means that, particularly in small devices such as wristwatches where battery capacity is limited by the device size, the duration time is shortened by increased power consumption and user convenience is also impaired.

SUMMARY OF INVENTION

An electronic device according to the present invention can reduce power consumption while adjusting the time by processing a satellite signal received from a positioning information satellite.

A first aspect of the invention entails an electronic device comprising a receiver configured to receive a satellite signal, a time generator configured to generate time, and a processor configured to selectively execute an automatic reception process or a manual reception process. The automatic reception process includes acquiring time information based on the received satellite signal and correcting the time based on the acquired time information. The automatic reception process is executed when a redetermined co edition is satisfied. The manual reception process includes calculating the position of the electronic device based on satellite orbit information and the received satellite signal, and correcting the time based on the calculated position. The manual reception process is executed based Oil manual operation.

In other aspects of the invention, the predetermined condition may include one or more of the following: (i) that a display time has reached a preset reception time, (ii) that an output from a solar powered generator is greater than or equal to a predetermined level, and/or (iii) that an output from an ultraviolet sensor is greater than or equal to a predetermined level. In some embodiments, the electronic device is a wristwatch that may have a crown or a button for the manual operation.

In another aspect of the invention, the electronic timepiece further comprises a memory that stores position information and time difference information corresponding to the calculated position. The second time correction processing further includes accessing the memory to acquire time difference information corresponding to the calculated position. The correcting of the time is then further based on the acquired time difference information.

Aspects of the invention makes the electronic timepiece more convenient when travelling across time zones because the time difference at the destination can be acquired and the time displayed by the timepiece automatically corrected to the current local time. More specifically, because the invention adjusts the time based on signals received from satellites, such as a GPS satellites, accessible all over the world, time difference information and time information can be acquired anywhere in the world, the time can be automatically adjusted in more geographical areas than is possible with a timepiece that uses standard time signals, and user convenience is thus improved.

The invention can therefore both reduce power consumption and automatically adjust the time difference without inconveniencing the user.

BRIEF DESCRIPTION OF THE DRAWINGS

FIGS. 5A to 5E schematically describe the structure of the GPS satellite signal.

FIGS. 6A and 6B schematically describe the structure of the GPS satellite signal.

DESCRIPTION OF THE PREFERRED EMBODIMENTS

Preferred embodiments of the present invention are described below with reference to the accompanying figures.

The embodiments described below are specific preferred embodiments of the present invention and certain technically preferred limitations are therefore also described, but the scope of the present invention is not limited to these embodiments or limitations unless specifically stated below.

Embodiment 1

Figure 1:
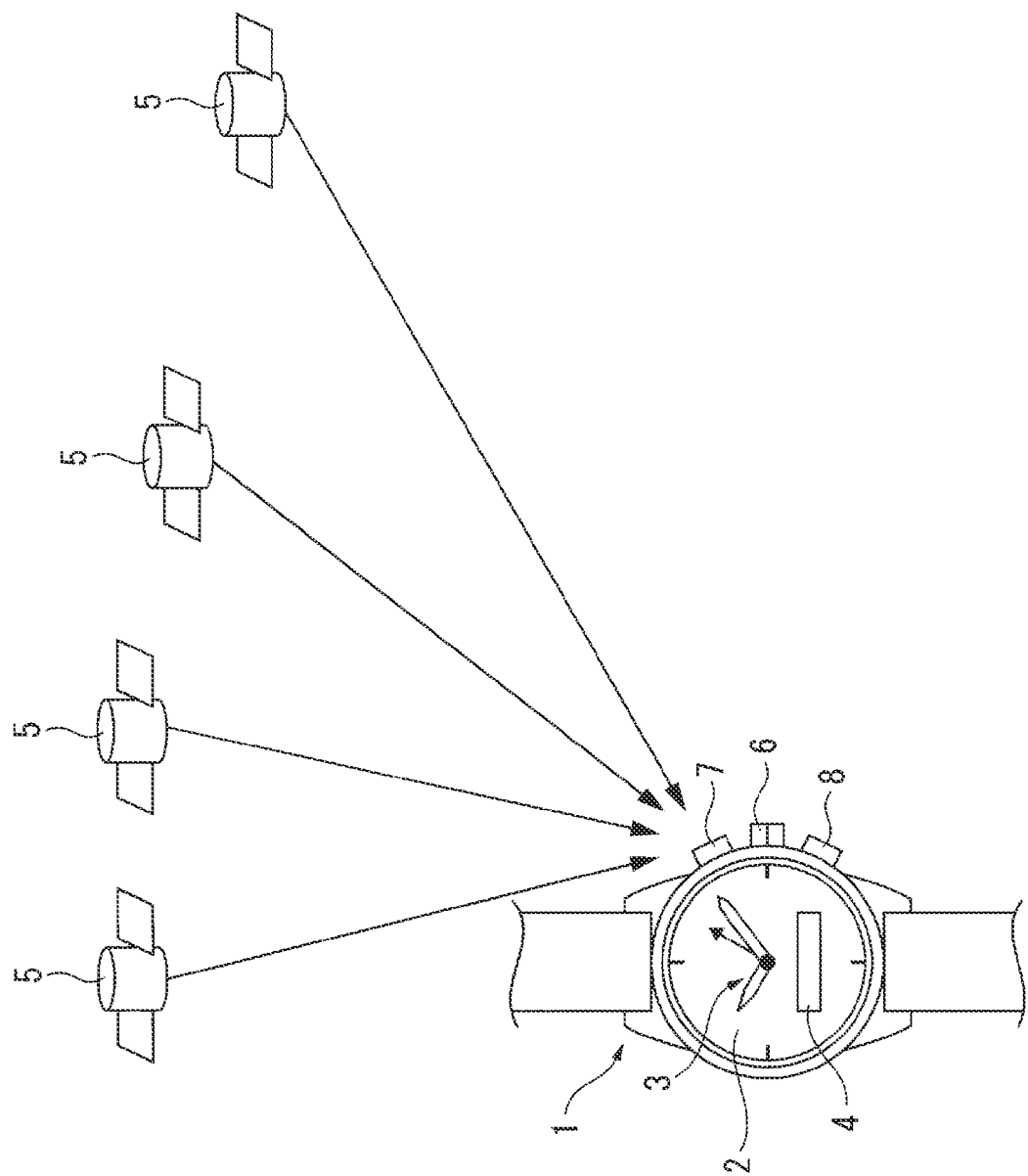
FIG. 1 is a schematic diagram showing a wristwatch with a GPS time adjustment device as an example of a timekeeping device with a time adjustment device according to the present invention.
Figure 2:
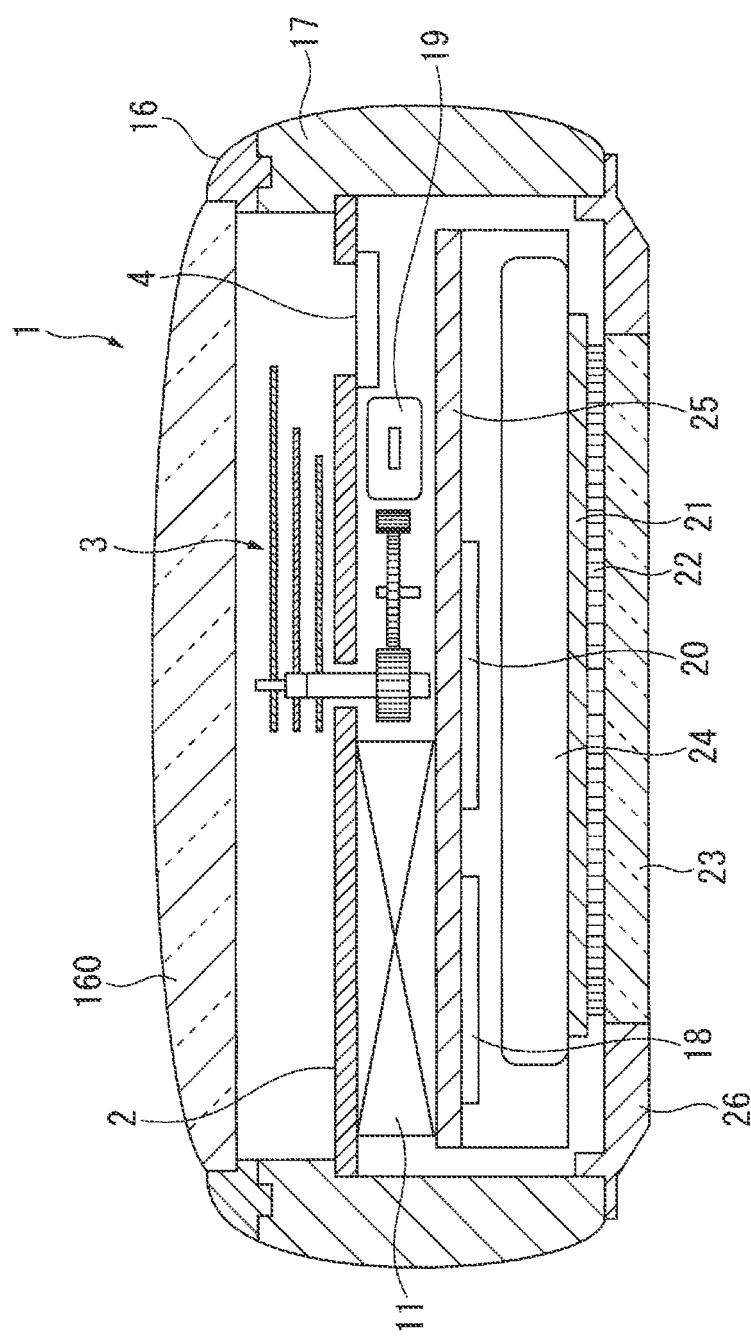
FIG. 2 is a schematic section view of the wristwatch with a GPS time adjustment device shown in FIG. 1.
Figure 3:
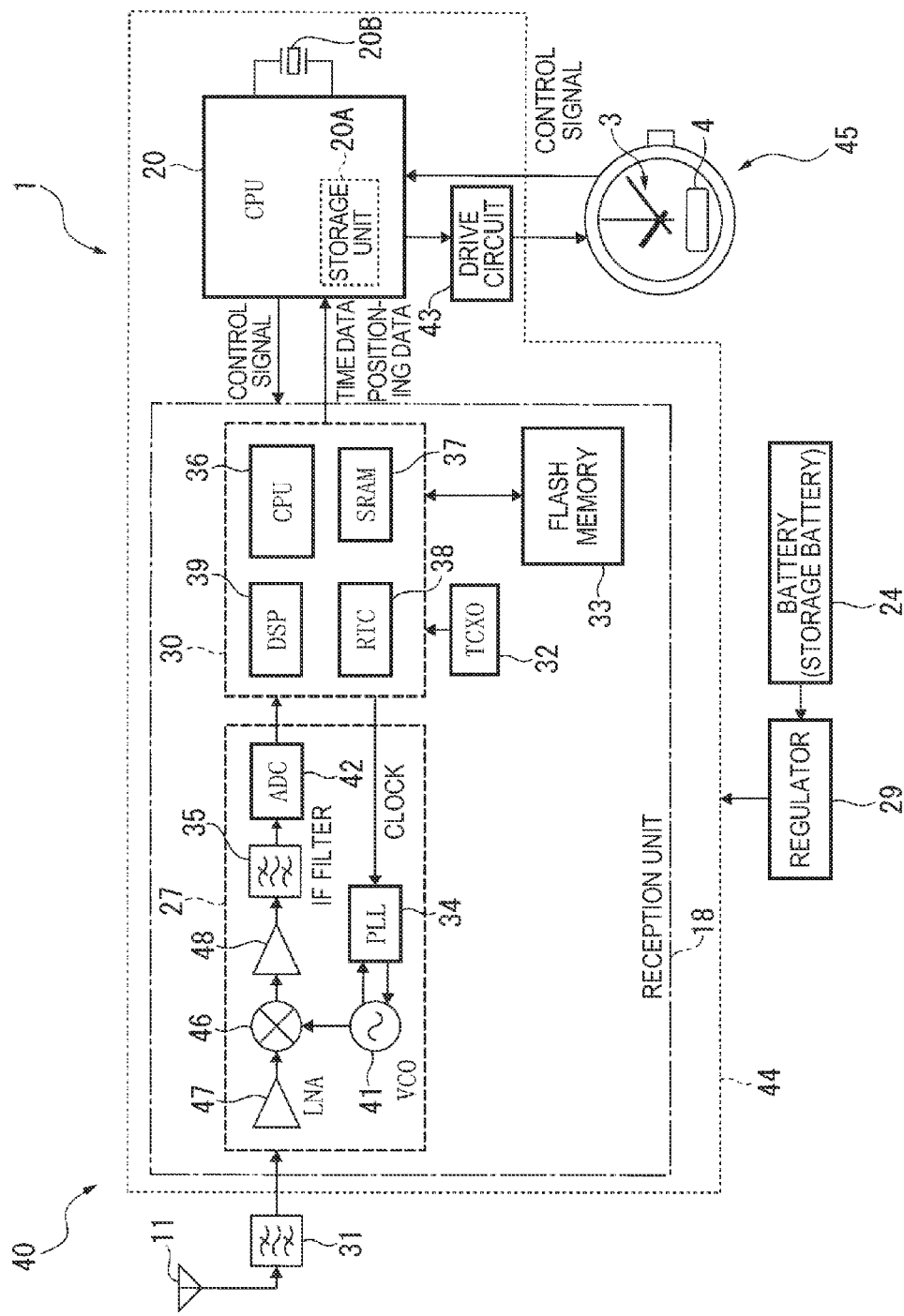
FIG. 3 is a block diagram showing the main internal hardware configuration of the wristwatch with a GPS time adjustment device shown in FIG. 1 and FIG. 2.

FIG. 1 is a schematic diagram showing a wristwatch with a GPS time adjustment device ("GPS wristwatch 1" below) as an example of a timekeeping device with a time adjustment device according to the present invention, and FIG. 2 is a schematic section view of the GPS wristwatch 1 in FIG. 1. FIG. 3 is a block diagram showing the main hardware configuration of the GPS wristwatch 1 shown in FIG. 1 and FIG. 2.

As shown in FIG. 1, the GPS wristwatch 1 has a time display unit including a dial 2 and hands 3. A window is formed in a part of the dial 2, and a display 4 such as an LCD panel is located in this window.

The hands 3 include a second hand, minute hand, and hour hand, and are driven through a wheel train by means of a stepping motor described below.

The display 4 is typically a LCD unit and is used for displaying the latitude and longitude, city name, or other location information, as well as messages.

The GPS wristwatch 1 receives satellite signals from a plurality of GPS satellites 5 orbiting the Earth on fixed orbits in space, acquires satellite time information, and can adjust the internally kept time based on the satellite time information.

The GPS satellite 5 is an example of a positioning information satellite used in the invention, and a plurality of GPS satellites 5 are orbiting the Earth in space. At present there are approximately 30 GPS satellites 5 in orbit.

The GPS wristwatch 1 has a crown 6 and buttons 7 and 8 as external operating members.

Internal Configuration of the GPS Wristwatch

The internal configuration of the GPS wristwatch 10 is described next.

As shown in FIG. 2, the GPS wristwatch 1 has an outside case 17 that is made of stainless steel, titanium, or other metal.

The outside case 17 is basically cylindrically shaped, and a crystal 160 is attached to the opening on the face side of the outside case 17 by an intervening bezel 16. A back cover 26 is attached to the opening on the back side of the outside case 17. The back cover 26 is annular and made of metal, and a back glass unit 23 is attached to the opening in the center.

Inside the outside case 17 are disposed a stepping motor for driving the hands 3, a GPS antenna 11, and a battery 24.

The stepping motor is a device that is commonly used in timepieces, and has a motor coil 19 and a stator and rotor not shown. The stepping motor drives the hands 3 by means of an intervening wheel train.

This GPS antenna 11 is a patch antenna for receiving satellite signals from a plurality of GPS satellites 5 orbiting the Earth on fixed orbits in space. The GPS antenna 11 is located on the opposite side of the dial 2 as the side on which the time is displayed, and receives RF signals through the crystal 160 and the dial 2.

The dial 2 and crystal 160 are therefore made from materials that pass RF signals, particularly the satellite signals transmitted from the GPS satellites 15. The dial 2, for example is plastic. The bezel 16 is ceramic in order to improve satellite signal reception.

A circuit board 25 is disposed on the back cover side of the GPS antenna 11, and a battery 24 is disposed on the back cover side of the circuit board 25.

The circuit board 25 is also populated with various circuit devices (such as IC devices) including a reception unit 18 that processes signals received by the GPS antenna 11 as described below, and a control unit 20 that controls, for example, the stepping motor that drives the hands 3. The reception unit 18 and the control unit 20 operate using power supplied from the battery 24.

The battery 24 is a lithium-ion battery or other type of storage battery. A magnetic sheet 21 is disposed below (on the back cover side of) the battery 24, and a charging coil 22 is disposed with the magnetic sheet 21 between it and the battery 24. The battery 24 can therefore be charged by the charging coil 22 by means of electromagnetic induction from an external charger. The magnetic sheet 21 can also divert the magnetic field. The magnetic sheet 21 therefore reduces the effect of the battery 24 and enables the efficient transmission of energy. The back glass unit 23 is disposed in the center part of the back cover 26 to facilitate power transmission.

The GPS wristwatch 1 is arranged as described above.

Circuit Design of the GPS Wristwatch

The circuit design of the GPS wristwatch 1 is described next.

As shown in FIG. 3, the GPS wristwatch 1 also has a GPS device 40, and a time adjustment device 44, and functions as a computer. As shown in FIG. 3, the time display device 45, the GPS device 40, and the time adjustment device 44 share some parts.

The configurations shown in FIG. 3 are further described below.

GPS Device

As shown in FIG. 3, the GPS wristwatch 1 has a GPS device 40 that receives and processes satellite signals received from a GPS satellite 5.

The GPS device 40 includes the GPS antenna 11, a filter (SAW) 31, and the reception unit 18. The filter (SAW) 31 is a bandpass filter and in this embodiment of the invention extracts a 1.5-GHz satellite signal. The GPS device 40 thus renders the reception unit of the present invention.

The reception unit 18 processes the satellite signal extracted by the filter, and includes an RF (radio frequency) unit 27 and baseband unit 30.

The RF unit 27 includes a PLL 34, IF filter 35, VCO (voltage controlled oscillator) 41, A/D converter 42, mixer 46, low noise amplifier 47, and IF amplifier 48.

The satellite signal is extracted by the filter 31 and amplified by the low noise amplifier 47, mixed by the mixer 46 with the signal from the VCO 41, and down-converted to an IF (intermediate frequency) signal.

The IF signal mixed by the mixer 46 passes the IF amplifier 48 and IF filter 35, and is converted to a digital signal by the A/D converter 42.

The baseband unit 30 also includes a digital signal processor (DSP) 39, a CPU (central processing unit) 36, SRAM (static random access memory) 37, and a real-time clock (RTC) 38. A temperature-compensated crystal oscillator (TCXO) 32 and flash memory 33 are also connected to the baseband unit 30.

The baseband unit 30 then processes the digital signal input from the A/D converter 42 of the RF unit 27 based on a control signal, and processes (decodes) the satellite signal to acquire the satellite time information and positioning information.

The clock signal of the PLL 34 is generated by the TCXO 32.

The RTC 38 generates time information on the receiver side for processing the satellite signals. The real-time clock 38 counts up at the reference clock output from the TCXO 32.

Time Adjustment Device

The time adjustment device 44 includes the reception unit 18, the control unit 20, and a drive circuit 43. This time adjustment device 44 renders the time information correction unit of the invention.

The control unit 20 includes a storage unit 20A and controls driving the GPS device 40, the hands 3, and the display 4. More specifically, the control unit 20 renders a reception control unit that sends control signals to the reception unit 18 and controls the reception operation of the GPS device 40.

Figure 4:
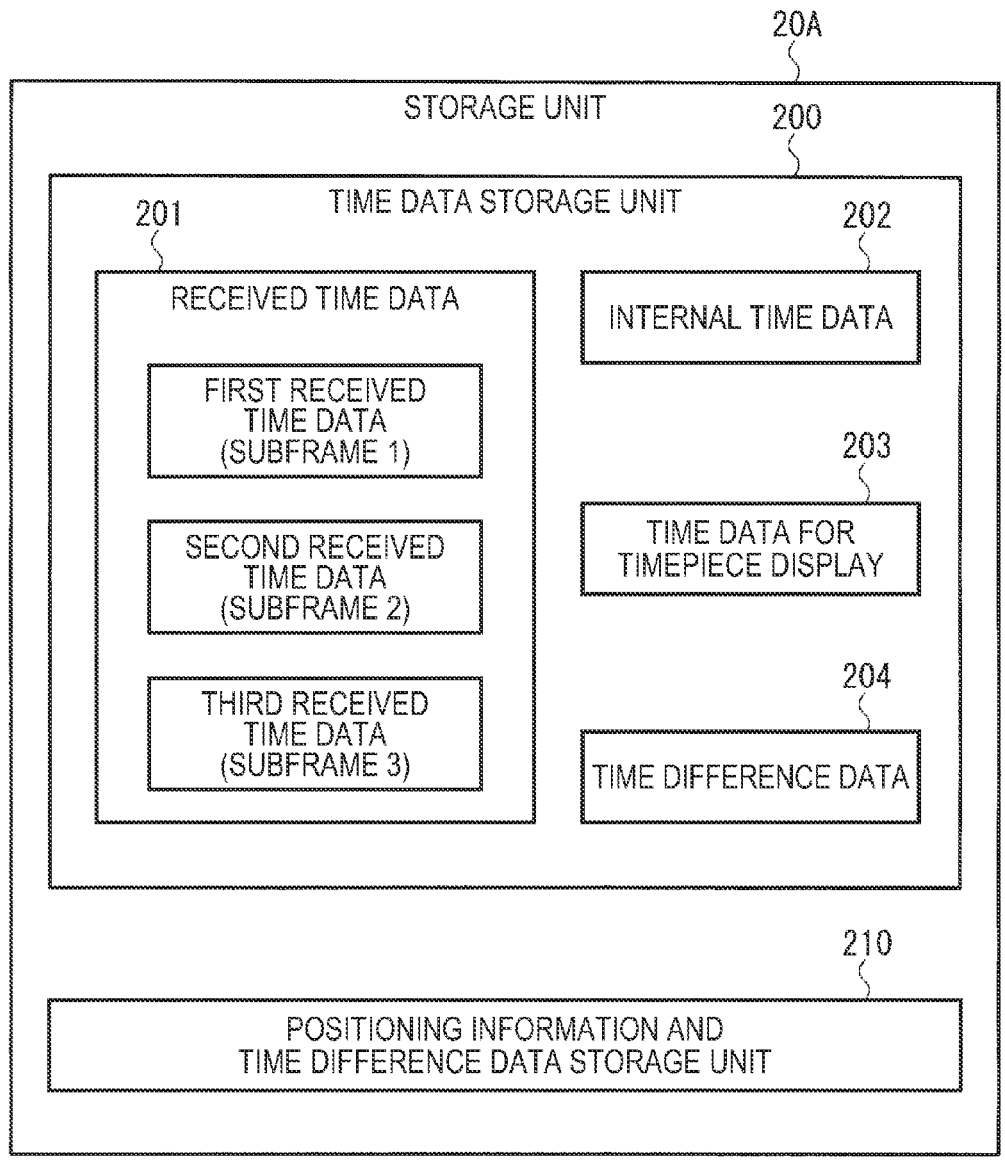
FIG. 4 is a block diagram showing the configuration of the storage unit in a first embodiment of the invention.

As shown in FIG. 4, the storage unit 20A includes a time data storage unit 200 and a positioning information and time difference data storage unit 210.

The received time data 201, internal time data 202, time data for timepiece display 203, and time difference data 204 are stored in the time data storage unit 200.

Three units of received time data can be stored as the received time data 201.

The internal time data 202 stores the internal time information that is generated based on a reference signal from the crystal oscillator 20B connected to the control unit 20. As a result, updating the internal time and moving the hands 3 can continue even if the supply of power to the reception unit 18 is stopped. The control unit 20 and crystal oscillator 20B thus render a time information generating unit that generates the internal time.

The time data for timepiece display 203 is used when the internal time data and the time displayed by the timepiece do not match, such as when the time is being adjusted and when the time difference is set. More specifically, when the internal time data 202 stores the UTC (Coordinated Universal Time) based on the time information acquired from a satellite signal, and the time difference data 204 is set, the time data for timepiece display 203 stores the time adjusted for this time difference.

The positioning information and time difference data storage unit 210 stores time difference data for each time zone, and stores the time difference data correlated to navigation information (positioning information).

The GPS wristwatch 1 thus comprised is driven by power supplied from a storage battery 24 through a regulator 29.

A lithium ion battery or other rechargeable storage battery is used as the battery 24 in this embodiment of the invention, but a lithium battery or other type of primary battery may be used instead. The charging method when a secondary storage battery is used is not limited to using a charging coil 22 to charge by means of electromagnetic induction from an external charger as used in this embodiment of the invention, and the battery may be charged using a solar cell or other type of generating device disposed to the GPS wristwatch 1.

A voltage detector (not shown in the figure) for detecting the voltage of the storage battery 24 is disposed to the control unit 20 to monitor the voltage of the storage battery 24. This battery voltage monitor may operate continuously, but normally operates at a predetermined interval in order to reduce power consumption.

Description of the Navigation Message

The navigation message that is the signal (satellite signal) transmitted from each GPS satellite 5 is described below. Note that the data carried in the navigation message is modulated at 50 bps to the satellite signal.

FIG. 5A to FIG. 7 schematically describe the GPS satellite signal.

As shown in FIGS. 5A to 5E, signals are transmitted from each of the GPS satellites 5 in units of one frame every 30 seconds. One frame contains five subframes. Each subframe is 6 seconds long, and contains 10 words (each word is 0.6 second).

The first word in each subframe is a telemetry (TLM) word storing the TLM data, and each TLM word starts with a preamble as shown in FIG. 6A.

The TLM word is followed by a handover word HOW storing the HOW (handover) data, and each HOW starts with the time of week (TOW) (also called the Z count) indicating the GPS time information of the GPS satellite as shown in FIG. 6B.

The GPS time is the number of seconds since 00:00:00 Sunday night, and is reset to zero at precisely 00:00:00 every Sunday night. The GPS time is thus information expressing the time since the start of the week in seconds, and the elapsed time is a number expressed in 1.5 second units. This GPS time is also called the Z count or the Z count data, and enables the GPS wristwatch 1 to know the current time.

Figure 7:
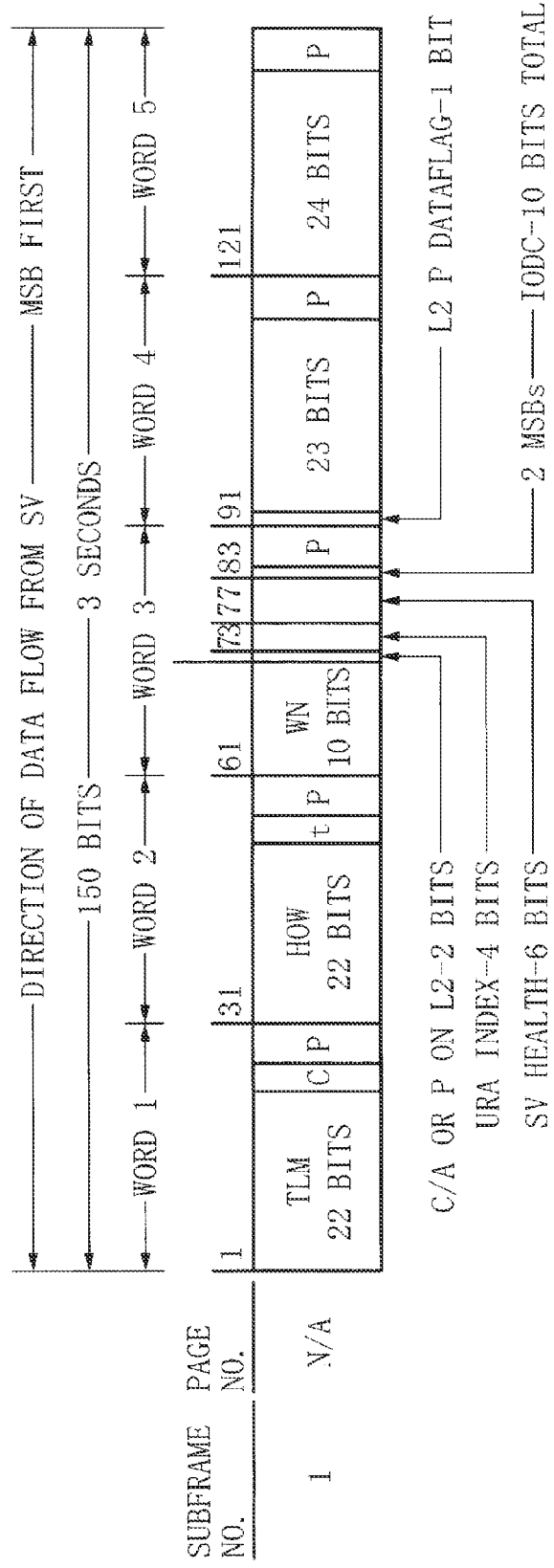
FIG. 7 schematically describes subframe 1 of the GPS signal.

As shown in FIG. 7, word hands 3 in subframe 1 contains words storing satellite correction data such as week number data (WN) and the satellite health information (SVhealth)

The same GPS week number identifies the week in which the current GPS time information is expressed.

More specifically, the starting point for the GPS time information is 00:00:00 of Jan. 6, 1980 referenced to the Coordinated Universal Time (UTC), and the week that started on this day is week 0. The GPS receiver can therefore get the precise GPS time from the week number and the elapsed time (number of seconds).

The week number is updated once a week.

Once the receiver gets the week number and counts the seconds passed since the week number was acquired, the current week number of the GPS satellite 5 can be known from the acquired week number and the elapsed time without getting the week number data again. As a result, the approximate current GPS time can be known once the Z count data is acquired. As a result, the GPS device 40 normally acquires only the Z count data when getting the time information.

The main frame of the navigation message contained in the signal from the GPS satellite 5 contains 1500 bits and is transmitted at 50 bps.

The main frame is divided into five subframes of 300 bits each.

One frame is equivalent to 30 seconds. One subframe is therefore equivalent to 6 seconds. As described above, the TLM word and the Z count data (TOW) in the HOW word are contained in the first two words of each subframe. The Z count data starts from subframe 1, and six seconds of data is contained in each subframe. Subframe 1 to subframe 5 therefore contain the TLM word and the Z count (TOW) data in the HOW word. The Z count (TOW) data is therefore the time information for the next subframe. For example, the Z count data in subframe 1 is the time data for subframe 2.

As shown in FIGS. 5A to 5E and FIGS. 6A and 6B, the navigation message carried in the satellite signal from the GPS satellite 5 includes the preamble data and the TOW in the HOW word, and subframe data, including satellite correction data such as the week number (WN) and satellite health data (SV HEALTH), the ephemeris (detailed orbit information for the transmitting GPS satellite 5), almanac (orbit information for all GPS satellites 5), and the UTC data. More specifically, the subframe data of the navigation message is carried in subframe 1 to subframe 5, and the data in these five subframes render one frame data unit. The subframe data is divided into words 1 to 10.

The HOW data or Z count data is therefore transmitted at 6-second intervals, and the week number, the ephemeris parameters and the almanac parameters are transmitted at 30-second intervals.

Because the signals described above are transmitted from the GPS satellites 5, satellite signal reception as used herein means phase synchronization with the C/A code in the satellite signal transmitted from each GPS satellite 5.

More specifically, the baseband unit 30 must synchronize with the signal from the GPS satellite 5 in order to get the frame data from a particular GPS satellite 5.

The C/A code is used for synchronization with 1 ms precision, and is a 1023-chip pseudo random noise code that repeats every 1 ms. The C/A code (1023 chip (1 ms) code) is different for each of the plural GPS satellites 5, and is unique to a particular satellite.

Therefore, to receive the satellite signal from a particular GPS satellite 5, the GPS device 40 generates the unique C/A code for a particular GPS satellite 5 and phase synchronizes with the C/A code from the selected GPS satellite 5 to receive the satellite signal.

By synchronizing with the C/A code (1023 chips (1 ms)), the preamble of the TLM word and the HOW word of each subframe can be received, and the Z count data (time information) can be acquired from the HOW word.

The positioning information can be acquired by reading the ephemeris parameters in the satellite signals from three to four satellites. The ephemeris data can be acquired by receiving 600 bits or approximately 12 seconds from the preamble of subframe 2, which is transmitted every 30 seconds.

The navigation message that is the satellite signal from the GPS satellites 5 is configured as described above.

System Configuration of the Time Adjustment Device (Time Information Adjustment Unit)

Figure 8:
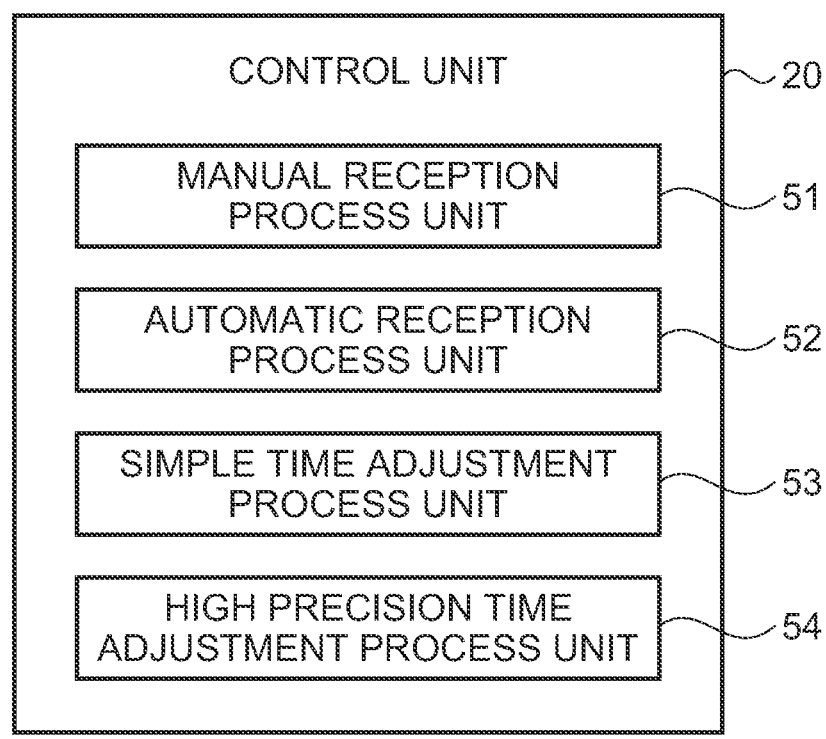
FIG. 8 is a block diagram showing the configuration of the control unit in a first embodiment of the invention.

The configuration of the control system for the GPS wristwatch 1 according to the invention is described next with reference to FIG. 8. FIG. 8 shows the function blocks rendered by primarily the control unit 20 executing a program.

More specifically, the control unit 20 includes a manual reception process unit 51, a automatic reception process unit 52, a simple time adjustment process unit 53, and a high precision time adjustment process unit 54.

The manual reception process unit 51 controls the reception unit 18 to execute a manual reception process when a predetermined operation is executed using the crown 6 or buttons 7 and 8 (external operating member) disposed to the GPS wristwatch 1.

The automatic reception process unit 52 automatically operates the reception unit 18 to execute the automatic reception process when the status of the GPS wristwatch 1 meets predetermined conditions. In this embodiment of the invention a condition for executing the automatic reception process is that the time data for timepiece display 203, which is updated by the control unit 20 based on a reference signal from the crystal oscillator 20B, reaches a predetermined time.

Figure 9:
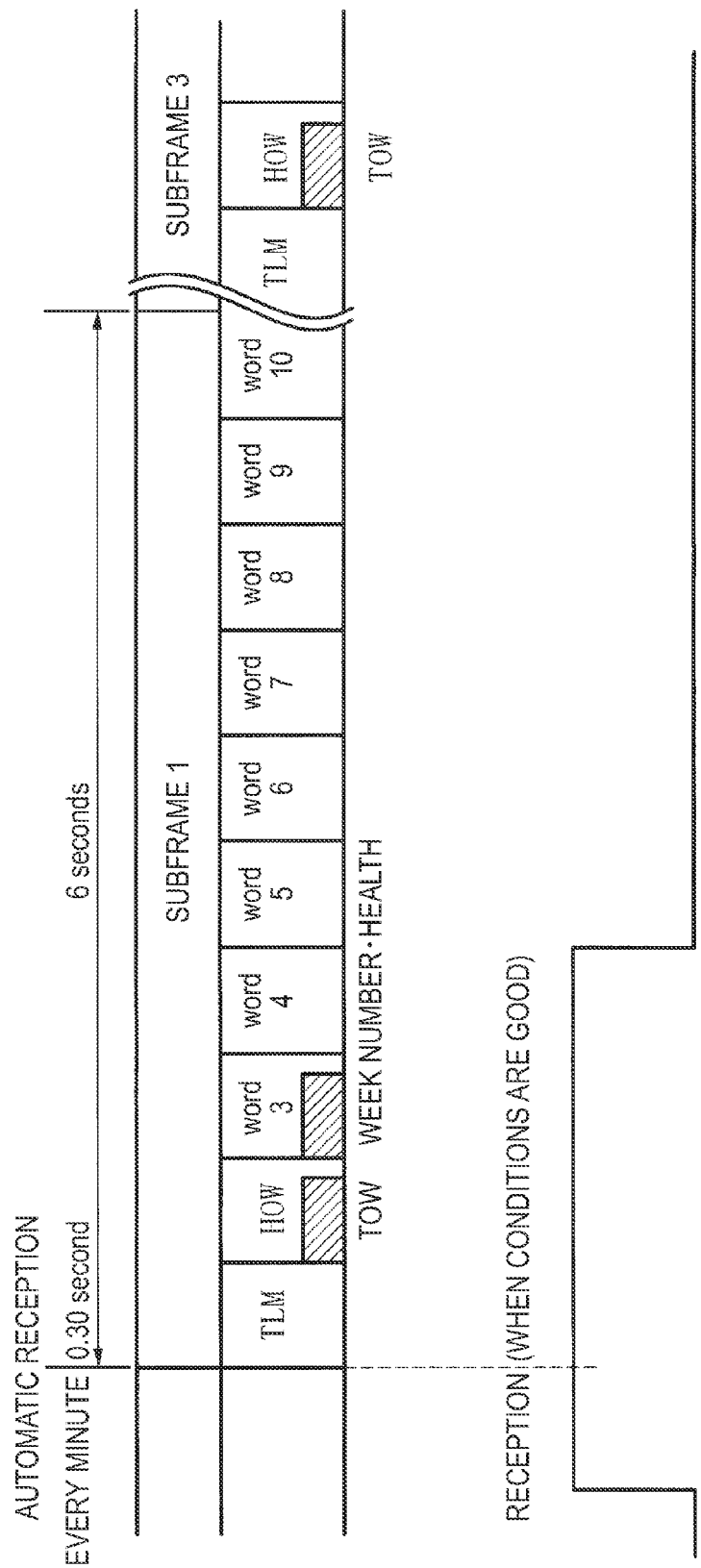
FIG. 9 describes the automatic signal reception timing in the first embodiment of the invention.

FIG. 9 describes automatic reception process of the automatic reception process unit 52. The automatic reception process tries to start the reception process at the timing of subframe 1, which is transmitted every minute at the 0 and 30 seconds. The timing at which reception starts must allow for enough time to capture a satellite before the time data is received, and several seconds are required to complete satellite capture when offset of the internal time is considered. The automatic reception process unit 52 therefore starts driving the reception unit 18 to execute the reception operation several seconds before the 0 or 30 second of the minute.

The automatic reception process must also receive at least the data through word 3 of subframe 1 containing the week number and satellite health information. In the example shown in FIG. 9, the process ends after receiving to word 4.

The simple time adjustment process unit 53 executes a simple time adjustment process to receive the satellite signal from one GPS satellite 5 by means of the reception unit 18, acquire the time information (Z count) from the received satellite signal, and adjust the internal time.

The high precision time adjustment process unit 54 executes a high precision time adjustment process to receive satellite signals from a plurality of GPS satellites 5 by means of the reception unit 18, acquire the time information and positioning information from the received satellite signal and determine the local position, and then adjust the internal time to the time acquired based on the positioning result.

This embodiment of the invention is configured so that the simple time adjustment process is executed by the simple time adjustment process unit 53 when the automatic reception process is executed by the automatic reception process unit 52.

The high precision time adjustment process of the high precision time adjustment process unit 54 is executed only when the manual reception process is executed by the manual reception process unit 51, and is not executed when the automatic reception process executes.

Automatic Reception Process

Figure 10:
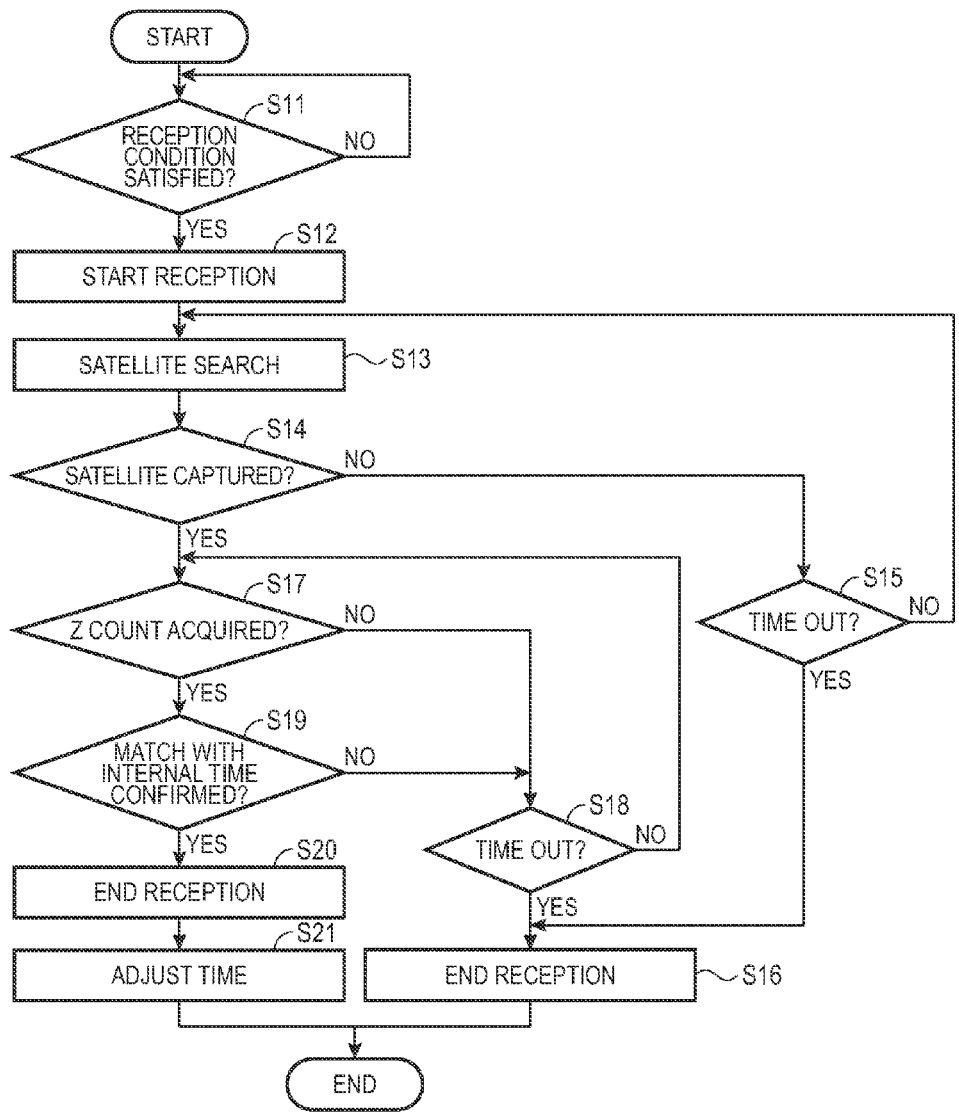
FIG. 10 is a flow chart of the automatic reception process in the first embodiment of the invention.

The automatic reception process of the GPS wristwatch 1 according to this embodiment of the invention is described next with reference to the flow chart in FIG. 10.

The automatic reception process unit 52 first determines if the reception conditions are satisfied (S11). In this embodiment of the invention the automatic reception process unit 52 references the time data for timepiece display 203 and determines if it has reached the preset reception time (reception start timing) in step S11.

Note that the reception start timing is set with consideration for the RF unit 27 startup time and the satellite search time so that data acquisition can start at the 0 or 30 second mark of the minute. For example, if data acquisition is to start at 2:00:00 and it takes 3 seconds to activate the RF unit 27 and search for a satellite, the reception start time is set to 3 seconds before 2:00:00, that is, 1:59:57.

The reception start time may be set to a time when the likelihood is high that the user will not be wearing the GPS wristwatch 1, such as sometime between 0:00 and 5:00. More particularly, the GPS wristwatch 1 is preferably stationary during the reception process in order for the GPS wristwatch 1 to execute the reception process in a stable condition. The automatic reception process is therefore preferably set for a time when the likelihood is high that the user is sleeping and the GPS wristwatch 1 is resting on a stand by a window, for example.

If the automatic reception process unit 52 determines in S11 that the reception conditions are satisfied, it starts the automatic reception process using the simple time adjustment process unit 53 (S12).

The simple time adjustment process unit 53 then drives the reception unit 18 and searches for a GPS satellite 5 (S13). In the satellite search process the simple time adjustment process unit 53 sequentially changes the satellite number SV from 1 to 30 to find the GPS satellite 5 identified by each satellite number SV and detect the signal level (SNR) of the satellite. More specifically, the simple time adjustment process unit 53 adjusts the timing of the C/A code for each GPS satellite 5 to find a GPS satellite 5 with which it can synchronize.

Satellite signals from all of the GPS satellites 5 are transmitted on the same frequency, but are transmitted using code division multiple access (CDMA) by using a different C/A code for each GPS satellite 5. The GPS satellites 5 that can currently be captured can therefore be determined by reading the C/A code contained in the received satellite signal.

As a result, the simple time adjustment process unit 53 adjusts the timing of the C/A code pattern for each GPS satellite 5 to find a GPS satellite 5 which it can synchronize.

The simple time adjustment process unit 53 then determines if one GPS satellite 5 was captured (S14).

More specifically, if the received satellite signal is correlated to the C/A code generated by the automatic reception process unit 52, the output will have an output peak at a predetermined time if the C/A codes are the same, but the output will not have a peak and be substantially flat at zero if the C/A codes differ.

Therefore, in S14 the simple time adjustment process unit 53 determines if a GPS satellite 5 was captured by evaluating the result of the C/A code correlation process.

If a satellite has not been captured in S14, the simple time adjustment process unit 53 determines if the satellite search process has timed out (S15).

More specifically, the code length of the C/A code is 1 ms, and the search for all GPS satellites 5 can be completed in approximately 2 seconds even if the C/A code output timing is adjusted and the Doppler frequency is also changed to search for all 30 GPS satellites 5. Therefore, if synchronization with a GPS satellite 5 is not possible by the time a predetermined time, such as 2 seconds, passes after reception starts, the simple time adjustment process unit 53 determines that the satellite capture process has timed out.

If satellite capture has not timed out in S15, the simple time adjustment process unit 53 continues the satellite search process in S13.

If operation has timed out in S15, the simple time adjustment process unit 53 controls the reception unit 18 to end the reception process (S16).

If the GPS wristwatch 1 is located where reception is not possible, such as indoors, operation will time out because there is no GPS satellite 5 with which it can synchronize even after searching for all GPS satellites 5. Continuing to drive the reception unit 18 in this situation will simply waste power.

As a result, the GPS wristwatch 1 ends the GPS satellite 5 search (reception) process in S16 if a GPS satellite 5 is not captured after a predetermined time has passed. This prevents wastefully consuming power.

If the simple time adjustment process unit 53 determines in S14 that a satellite was captured, it starts the Z count acquisition process and then determines if the Z count of the satellite signal received from the GPS satellite 5 could be acquired (S17). Because reception starts from subframe 1 in the automatic reception process, whether the Z count from subframe 1 could be acquired is determined first.

If the simple time adjustment process unit 53 determines in S17 that the Z count could not be acquired, it determines if operation timed out (S18).

If the simple time adjustment process unit 53 determines in S18 that operation did not time out, it continues the Z count acquisition process and again determines in S17 if the Z count was acquired.

If the simple time adjustment process unit 53 determines in S18 that operation timed out, it ends the reception process (S16).

More specifically, because the Z count is carried in each subframe, it is transmitted every 6 seconds. Furthermore, because this embodiment may at most receive the Z count carried in subframes 1 to 3, operation times out and the reception process ends if the simple time adjustment process unit 53 cannot recognize the Z count data signal by the time 18 seconds pass after the Z count acquisition process starts.

If the Z count is acquired in S17, the simple time adjustment process unit 53 applies a parity check to the received Z count (time data) and matches it with the internal time (S19).

In S19 the simple time adjustment process unit 53 verifies the received Z count (time information) and the internal time data 202 stored in the time data storage unit 200. Because as described above the simple time adjustment process unit 53 does not run the positioning process, it verifies the time by comparing the internal time data with the time information corrected by a preset transmission delay time.

If a match with the internal time data is not confirmed in S19, the simple time adjustment process unit 53 determines if operation timed out in S18, and continues the Z count acquisition process if operation did not time out. Because it takes 18 seconds for a timeout to occur, the simple time adjustment process unit 53 also processes subframes 2 and 3 in this embodiment of the invention. The simple time adjustment process unit 53 stores the data acquired from subframes 1 to 3 as the received time data 201 in the time data storage unit 200.

The simple time adjustment process unit 53 determines a match with the internal time data using the Z count data from the acquired subframes 2 and 3.

If a match is confirmed in S19, the simple time adjustment process unit 53 controls the reception unit 18 to stop reception (S20).

The simple time adjustment process unit 53 then uses the acquired Z count (satellite time data) to adjust the internal time (S21). The simple time adjustment process unit 53 determines the Coordinated Universal Time (UTC) by adding the UTC offset (currently +14 seconds) to the acquired Z count, and stores the result as the internal time data 202 in the time data storage unit 200. The simple time adjustment process unit 53 then calculates the current local time by adding the time difference data 204 to the internal time data 202, and updates the time data for timepiece display 203 to this current local time.

The control unit 20 then controls the drive circuit 43 to display the updated time data for timepiece display 203 using the hands 3.

If shortening the reception time is desirable, the reception process may be ended without receiving subframe 3 if a match with the internal time data is confirmed when subframe 2 is received. This has the effect of reducing power consumption by shortening the reception time.

Manual Reception Process

Figure 11:
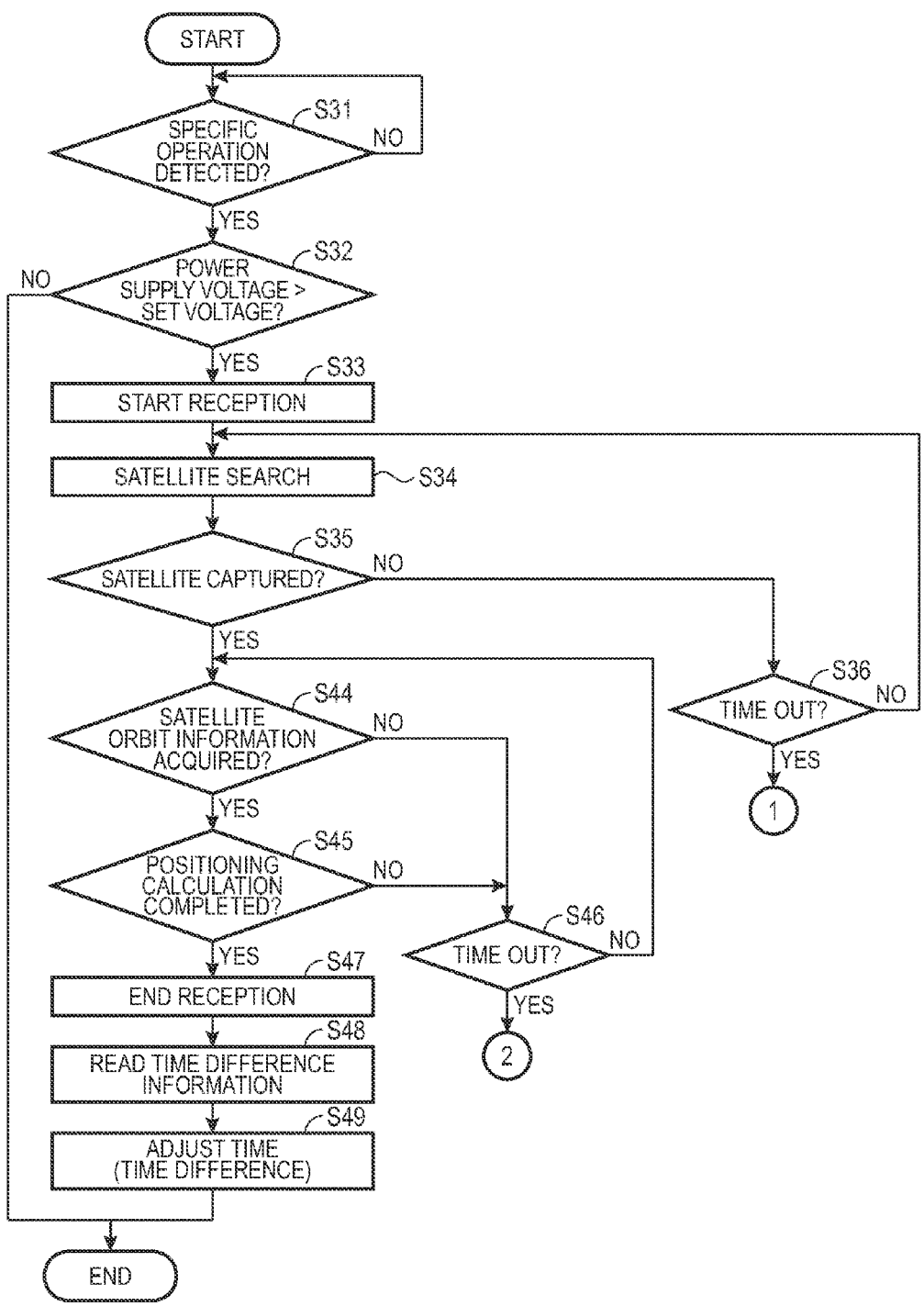
FIG. 11 is a flow chart of the manual reception process in the first embodiment of the invention.

The manual reception process of the GPS wristwatch 1 according to this embodiment of the invention is described next with reference to the flow chart in FIG. 11.

The manual reception process unit 51 decides if an external operating member such as the crown 6 or buttons 7 and 8 disposed to the GPS wristwatch 1 has been operated in a specific way (S31).

If the manual reception process unit 51 detects in S31 that the specific operation was asserted, it determines if the power supply voltage (the voltage of the storage battery 24) is greater than a predetermined voltage (S32).

Because the manual reception process also determines the current location using the high precision time adjustment process unit 54, the reception time is a relatively long 1 to 3 minutes, and power consumption therefore increases. The manual reception process unit 51 therefore first detects the power supply voltage to determine if there is sufficient voltage to enable reception for 1 to 3 minutes.

If the power supply voltage is less than or equal to the predetermined voltage in S32, the manual reception process unit 51 ends the manual reception process.

If the power supply voltage is greater than the predetermined voltage in S32, the manual reception process unit 51 uses the high precision time adjustment process unit 54 to start manual reception (S33).

The high precision time adjustment process unit 54 drives the reception unit 18 to search for the GPS satellites 5 (S34). This satellite search process is the same as the satellite search step S13 in the automatic reception process, and looks for GPS satellites 5 with which synchronization is possible by adjusting the output timing of the C/A codes for the GPS satellites 5.

The high precision time adjustment process unit 54 then determines if four GPS satellites 5 could be captured (S35). While the number of GPS satellites 5 captured differs, the content of this satellite capture determination step S35 is the same as the satellite capture determination step S14 in the automatic reception process. More specifically, the simple time adjustment process unit 53 determines whether or not one GPS satellite 5 was captured because it is only necessary to acquire the Z count data, but the high precision time adjustment process unit 54 must capture four GPS satellites 5 for positioning.

The high precision time adjustment process unit 54 therefore determines if the GPS satellites 5 were captured by evaluating the results of the C/A code correlation process.

If S35 determines that the satellites could not be captured, the high precision time adjustment process unit 54 determines if operation timed out in the same way as in step S15 described above (S36).

If operation did not time out (S36 returns No), the high precision time adjustment process unit 54 continues the satellite search process in S34.

Figure 12:
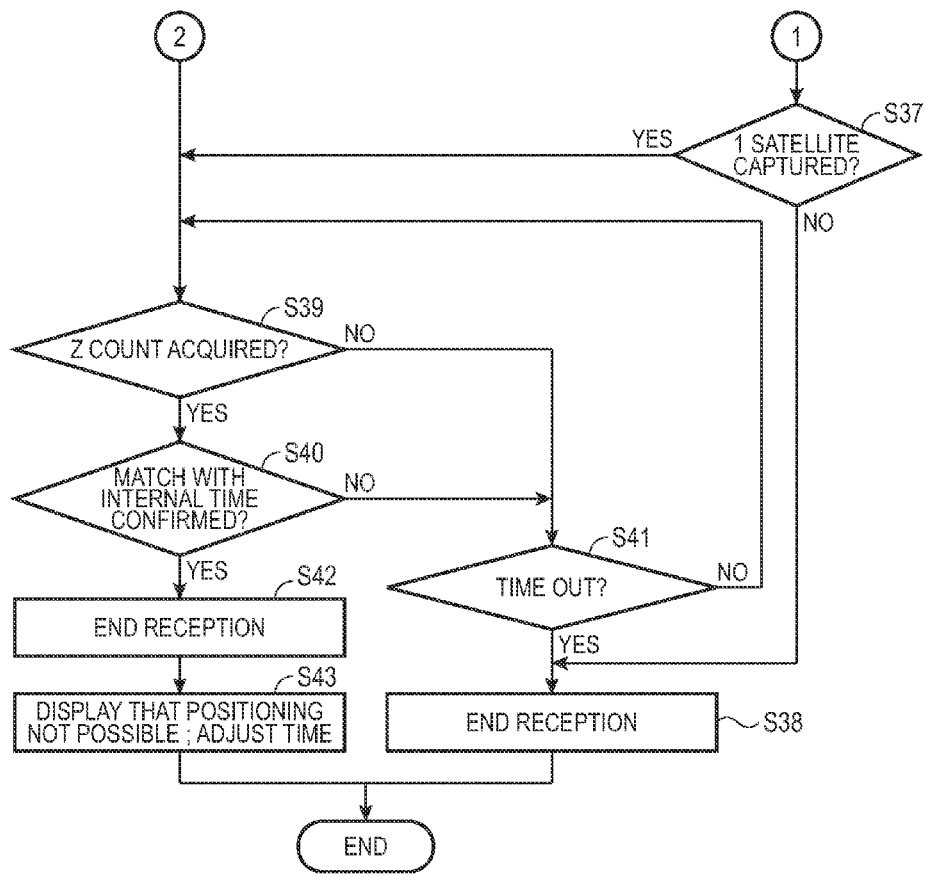
FIG. 12 is a continuation of the flow chart in FIG. 11.

If operation did time out (S36 returns Yes), the high precision time adjustment process unit 54 determines if one GPS satellite 5 was captured as shown in FIG. 12 (S37). More specifically, if four GPS satellites 5 cannot be captured, operation shifts from the high precision time adjustment process to the simple time adjustment process in order to capture one GPS satellite 5, acquire the time data (Z count), and adjust the time.

If in S37 one GPS satellite 5 has not been captured, the high precision time adjustment process unit 54 controls the reception unit 18 to end the reception process (S38).

If S37 determines that one GPS satellite 5 was captured, the high precision time adjustment process unit 54 operates the simple time adjustment process unit 53 to execute the simple time adjustment process. This simple time adjustment process is the same as shown in steps S17 to S21 in FIG. 10.

More particularly, the simple time adjustment process unit 53 determines if the Z count was acquired as described in S17 (S39).

If the Z count was acquired, the simple time adjustment process unit 53 applies a parity check to the received Z count (time data) and adjusts the internal time as described in S19 (S40).

If S39 determines that the Z count was not acquired, and if a match with the internal time data is not confirmed in S40, the simple time adjustment process unit 53 determines if operation timed out as in S18 (S41). If the simple time adjustment process unit 53 determines that operation timed out in S41, the reception process ends (S38). If operation did not time out, the Z count acquisition evaluation process continues (S39).

If a match is confirmed in S40, the simple time adjustment process unit 53 controls the reception unit 18 to stop reception (S42).

The simple time adjustment process unit 53 then uses the acquired Z count (satellite time data) to adjust the internal time as described in S21 (S43).

More specifically, the simple time adjustment process unit 53 determines the Coordinated Universal Time (UTC) by adding the UTC offset (currently +14 seconds) to the acquired Z count, and stores the result as the internal time data 202 in the time data storage unit 200. Because the plural GPS satellites 5 required for positioning could not be captured, the positioning information could not be acquired, and the simple time adjustment process unit 53 also cannot acquire the time difference information for the current location based on the positioning information. The simple time adjustment process unit 53 therefore updates the time data for timepiece display 203 based on the previously set time difference data 204 and displays the updated time using the hands 3.

Because the high precision time adjustment process unit 54 cannot update the time difference data 204 when the positioning information cannot be acquired, the time data for timepiece display 203 will match the current local time if the current location is in the same time zone as the previously set time difference data 204, but will differ from the current local time if a different time zone has been entered. In this embodiment of the invention, therefore, the high precision time adjustment process unit 54 indicates on the display 4 that positioning was not possible so that if the user will not mistake the displayed time for the correct current local time if the user is crossing time zones.

In this situation the user may operate the buttons 7 and 8, for example, to manually enter the time difference data 204 so that the current local time is displayed.

If it is determined in S35 that four GPS satellites 5 were captured, the high precision time adjustment process unit 54 determines if orbit data (ephemeris) could be acquired for each of the GPS satellites 5 (S44).

If the high precision time adjustment process unit 54 determines in S44 that the orbit data was acquired, it determines if the positioning calculation based on the acquired orbit data has been completed (S45).

If orbit data acquisition is not completed in S44 or if the positioning calculation is not completed in S45, the high precision time adjustment process unit 54 determines if operation timed out and confirms if these processes ended in the predetermined time (S46). Note that this timeout time is set according to the number of reception channels in the GPS wristwatch 1. More specifically, if the GPS wristwatch 1 has a plurality of channels enabling simultaneously receiving satellite signals from a plurality of GPS satellites 5, the timeout time may be set to approximately 1 minute, for example. However, if the GPS wristwatch 1 only has one reception channel, the GPS satellites 5 must be captured and data acquired one at a time, and the timeout time may be set to approximately 3 to 4 minutes, for example, because it takes approximately 3 to 4 minutes to complete the reception process.

If operation has not timed out in S46, steps S44 and S45 repeat. If operation has timed out in S46, operation shifts from the high precision time adjustment process to the simple time adjustment process, and steps S39 to S43 described above execute.

If the positioning calculation has ended in S45, the high precision time adjustment process unit 54 controls the reception unit 18 to end the reception process (S47), and reads the time difference information from the positioning information and time difference data storage unit 210 based on the acquired navigation data (positioning information) (S48). More specifically, a data table describing the relationship between the positioning information and time difference information (positioning information and time difference data storage unit 210) is stored in the time data storage unit 200. The high precision time adjustment process unit 54 can therefore determine in which time zone the acquired positioning information is contained and can read the time difference information for that time zone.

This time difference information is stored as the time difference data 204 in the time data storage unit 200.

Note that because the navigation process executed in a common car navigation system must continuously detect the current location, it must execute the navigation process continuously. However, the positioning process executed in this embodiment of the invention achieves its purpose once the current location has been determined when the high precision time adjustment process is triggered manually, and it is not necessary to execute the navigation (positioning) process continuously. Therefore, if the positioning calculation has completed and the current location has been determined in S45, the reception process can be ended.

The high precision time adjustment process unit 54 also uses the time difference data 204 and adjusts the hands 3 to display the current time at the current location (S49). More specifically, the high precision time adjustment process unit 54 adds the UTC offset to the received satellite time information (Z count data and week number) to get the UTC, and updates the internal time data 202 to this value. The high precision time adjustment process unit 54 then determines the time at the current location using the internal time data 202 and time difference data 204, and updates the time data for timepiece display 203.

Note that the high precision time adjustment process unit 54 may also display the acquired positioning information and time zone information on the display 4.

As described above, the GPS wristwatch 1 adjusts the time by means of the simple time adjustment process unit 53 when the automatic reception process is executed by the automatic reception process unit 52.

However, when the manual reception process is executed by the manual reception process unit 51, the positioning information and time difference information are acquired by the high precision time adjustment process unit 54, and the time is adjusted to the local time based on the positioning information (time difference information) and the acquired time information if data acquisition is successful. If data acquisition failed, however, the time is adjusted based only on the acquisition of time information by the simple time adjustment process unit 53.

The effect of this embodiment of the invention is described next.

(1) During the automatic reception process the GPS wristwatch 1 receives the Z count data from only one GPS satellite 5 and adjusts the internal time data by means of the simple time adjustment process unit 53. During the automatic reception process the internal time can therefore be adjusted with a short reception process, and power consumption can be reduced in the automatic reception process.

More specifically, because the automatic reception process is executed without being invoked by the user, it is unclear whether the GPS wristwatch 1 is located where satellite signals from the GPS satellites 5 can be easily received. If the reception environment is poor and the positioning process that requires capturing four GPS satellites 5 executes, the likelihood that the required information can be acquired is low, reception is therefore time-consuming, and power consumption increases.

When the automatic reception process runs in this embodiment of the invention, however, only the Z count data is acquired and power consumption can be reduced because the positioning process does not execute.

(2) In this embodiment of the invention the high precision time adjustment process unit 54 that executes the positioning process operates only when the manual reception process is invoked, and does not operate when the automatic reception process runs, and the likelihood of the positioning process succeeding can be improved.

More specifically, the manual reception process is executed when the user operates an external operating member. In this situation the user generally invokes the manual reception process where satellite signals from the GPS satellites 5 can be easily received, such as outdoors. Therefore, if the positioning process that requires capturing four GPS satellites 5 is set to execute only in the manual reception process, the reception process executes where it is easy to capture a plurality of GPS satellites 5, such as outdoors, and the probability of the positioning process succeeding can be improved.

(3) Because the automatic reception process executes when a predetermined time is reached, the Z count data can be received and the time adjusted once a day. As a result, the correct time can be automatically displayed on the GPS wristwatch 1.

(4) Because the manual reception process executes the positioning process when reception is manually invoked by the user, the Coordinated Universal Time (UTC) and time difference at the current location can be automatically acquired if the user performs the operation to start manual reception after moving into a different time zone, such as when travelling abroad, for example. The current local time can therefore be automatically displayed, and the convenience of the GPS wristwatch 1 can be improved.

Furthermore, because the positioning process of the high precision time adjustment process unit acquires the time difference, it only needs to determine the time zone of the current location. It therefore does not need to continuously detect the current location, unlike a conventional car navigation system, the operating time of the reception unit 18 can be greatly reduced compared with the positioning process of a car navigation system even when the positioning process executes, and power consumption can also be reduced.

(5) Because the automatic reception process is set to run at 2:00 a.m., for example, the possibility that the GPS wristwatch 1 is stationary is high, and reception performance can be improved.

In addition, because the satellite health information is acquired in the manual reception process and the automatic reception process, whether the GPS satellite 5 from which signals are received is currently healthy can be determined. As a result, adjusting the time to the wrong time as a result of receiving signals from a GPS satellite 5 that is not healthy can be prevented even when adjusting the internal time based on the Z count data.

(6) Furthermore, because the manual reception process unit 51 and automatic reception process unit 52 control the reception unit 18 to stop the reception unit 18 when the reception process is not executing, current consumption can be further suppressed.

Embodiment 2

A second embodiment of the invention is described next. Note that in each of the embodiments described below parts that are the same or similar to like parts in another embodiment are identified by the same reference numerals, and further description thereof is omitted or simplified.

The first embodiment executes the automatic reception process once a day by determining if a predetermined time has arrived as the reception condition in S11. This second embodiment differs from the first embodiment in that a plurality of reception times are set in one day, and reception is controlled to execute once a day by determining if a prescribed amount of time has passed since the last successful reception. Other aspects of the automatic reception process and the manual reception process are the same as described in the first embodiment, and further description thereof is omitted below.

Figure 13:
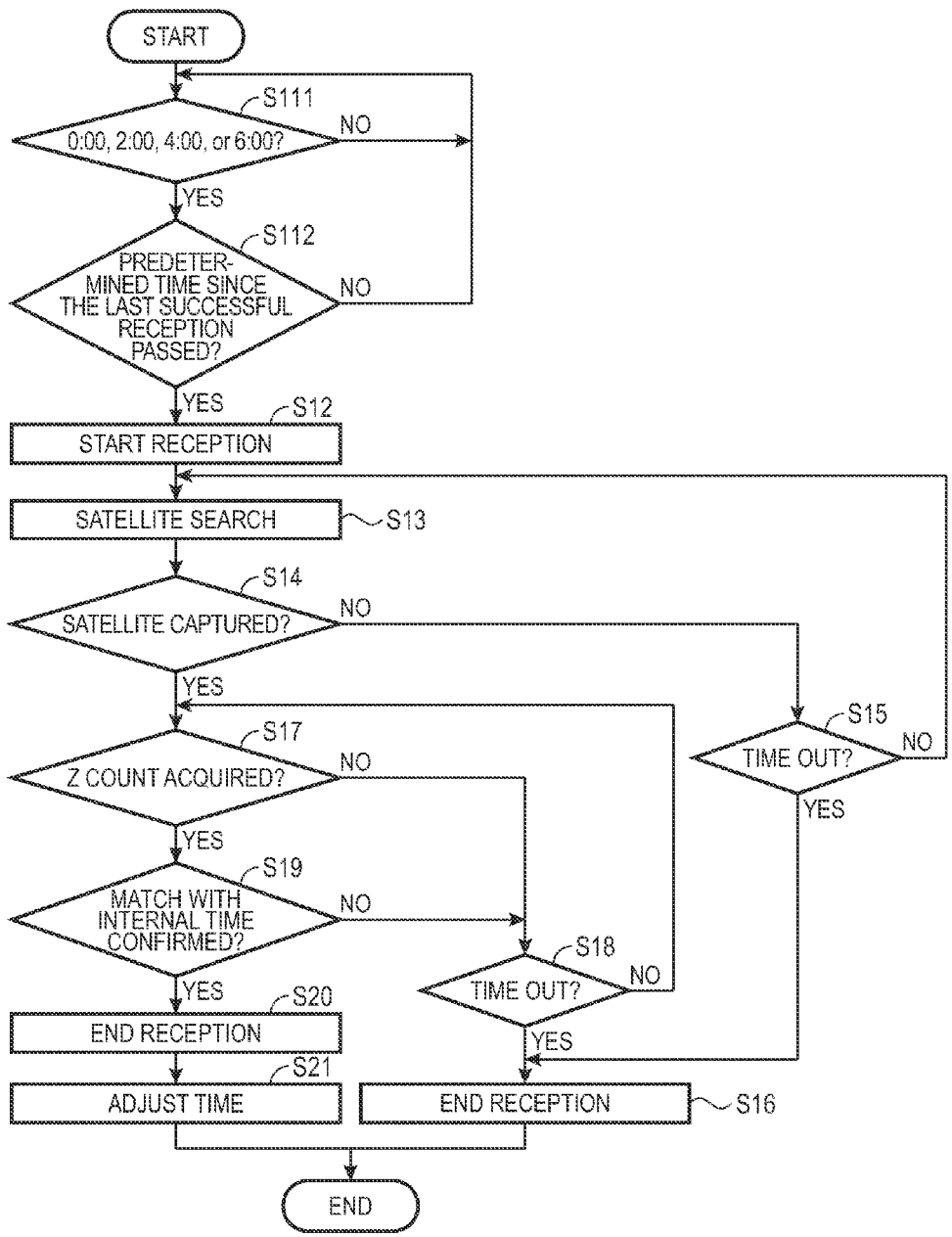
FIG. 13 is a flow chart of the automatic reception process in a second embodiment of the invention.

As shown in FIG. 13, the automatic reception process unit 52 in the second embodiment determines if the time data for timepiece display 203 has reached a time set as the automatic reception time, and more specifically determines if the time is 12:00 a.m., 2:00 a.m., 4:00 a.m., or 6:00 a.m. (S111).

If the time is one of these set times in S111, whether the predetermined time since the last successful reception has passed is determined (S112). Whether this time has passed is determined in S112 so that reception does not occur more than once a day, that is, so that the reception process does not repeat at 2:00, 4:00, or 6:00 if reception is successful at midnight (0:00). This predetermined time may therefore be set to, for example, seven hours or more.

The reception process does not execute more than once a day because timepiece precision does not require receiving the satellite signal more than once a day, and power consumption increases accordingly if the signal is received more than once a day.

Therefore, if the predetermined time has not passed since the last successful reception in S112, steps S111 and S112 repeat.

However, if the predetermined time since the last successful reception has passed in S112, the automatic reception process unit 52 uses the simple time adjustment process unit 53 and starts the automatic reception process in the same way as described in the first embodiment (S12). The steps executed by the simple time adjustment process unit 53 from S12 to S21 are the same as described in the first embodiment, and further description thereof is thus omitted.

This second embodiment of the invention has the same effect as the first embodiment.

In addition, because four automation reception times are set in S111, the possibility of successful reception can be improved compared with setting only one automatic reception time.

In addition, because the four automatic reception times are set at two hour intervals, reception is possible with the satellites at different positions, and if reception fails one at one automatic reception time due to the satellite locations, the probability of reception succeeding at the next automatic reception time can be improved. More specifically, because the GPS satellites 5 circle the Earth in approximately 12 hours, the satellite locations change and the reception conditions change if there is approximately two hours between the reception times.

Furthermore, because step S112 checks if a predetermined time has passed since the last successful reception so that reception does not occur more than once a day, execution of the reception process can be minimized and power consumption can be reduced.

Embodiment 3

A third embodiment of the invention is described next.

The condition for running the automatic reception process in the first and second embodiments is whether the time has reached a preset time set, but in this third embodiment is set to whether or not the GPS wristwatch 1 is outdoors.

More specifically, the GPS wristwatch 1 according to this third embodiment of the invention has an outdoor detector for determining if the wristwatch 1 is outdoors or not. A solar power generating device or an ultraviolet sensor, for example, may be used as the outdoor detector.

If the wristwatch has a solar power generating device, the power output is greater when outdoors exposed to sunlight than when exposed to indoor lighting. Therefore, if the output power is detected to equal or exceed a predetermined level, the GPS wristwatch 1 is known to be outdoors.

Furthermore, sunlight contains ultraviolet light but indoor lighting contains substantially no ultraviolet light. Therefore, if the output of the ultraviolet sensor is equal to or exceeds a predetermined level, the GPS wristwatch 1 is known to be outdoors.

Figure 14:
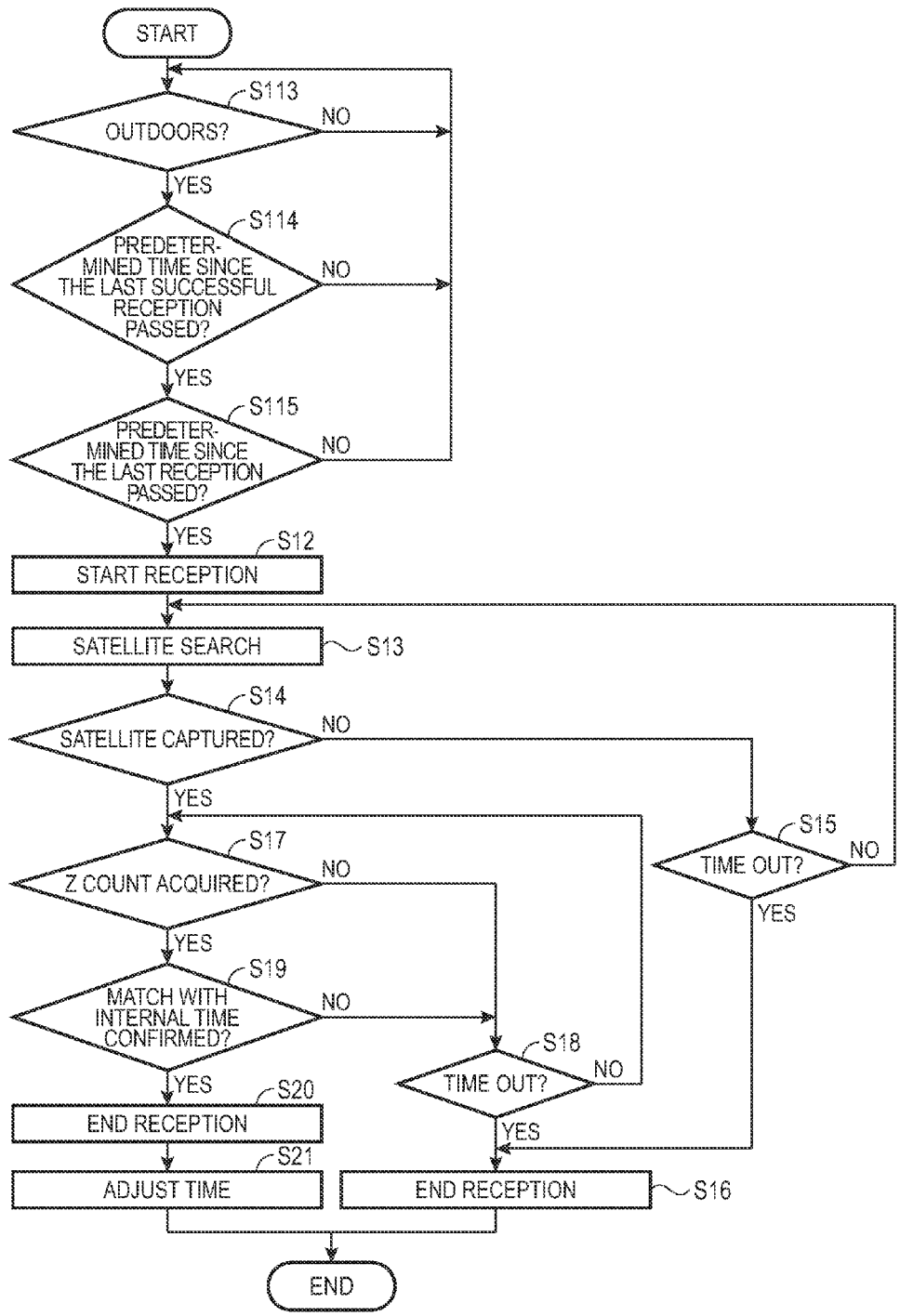
FIG. 14 is a flow chart of the automatic reception process in a third embodiment of the invention.

As shown in FIG. 14 the automatic reception process unit 52 in the third embodiment first uses the outdoor detector to determine if the GPS wristwatch 1 is outdoors or not (S113).

If the GPS wristwatch 1 is determined to be outdoors in S113, the automatic reception process unit 52 determines if a predetermined time since the last successful reception has passed (S114). The automatic reception process unit 52 prevents executing the automatic reception process two or more times in one day even if the GPS wristwatch 1 is outdoors by determining if 22 hours, for example, have passed since the last successful reception.

If the predetermined time has passed in S114, the automatic reception process unit 52 determines if a predetermined time has passed since the last reception process (S115). In this embodiment the automatic reception process unit 52 determines if 10 minutes, for example, have passed as the predetermined time since the last reception process.

Step S115 is executed to prevent repeating the automatic reception process after a short time. More specifically, if in S113 the GPS wristwatch 1 is detected to be outdoors, and in S114 22 hours or more are determined to have passed since the last successful reception, the automatic reception process unit 52 executes the reception process. If reception fails this time, reception repeats until the conditions in S113 and S114 are satisfied. As a result, if the reception process executes and fails, step S115 prevents the reception process from repeating until at least the predetermined time (10 minutes) has passed since the failed reception.

If S115 determines that at least the predetermined time has passed, the automatic reception process unit 52 uses the simple time adjustment process unit 53 and starts the automatic reception process in the same way as described in the first embodiment (S12). Thereafter, the simple time adjustment process unit 53 executes the same process as the automatic reception process described in the first embodiment.

This third embodiment of the invention has the same effect as the first embodiment.

Furthermore, because this embodiment executes the reception process after detecting outdoors in S113, the probability of capturing a GPS satellite 5 and reception succeeding can be improved.

In addition, because step S114 checks if a predetermined time (such as 22 hours) since the last successful reception has passed so that reception does not occur more than once a day, the reception process can be minimized and power consumption can be reduced.

In addition, because S115 checks if a predetermined time (such as 10 minutes) has passed since the last reception process, repeating the reception process after a short time can be prevented and depletion of the storage battery 24 can be prevented.

Variations

The invention is not limited to the embodiments described above.

More specifically, the conditions of the invention for executing the automatic reception process are not limited to those described above. For example, scheduled reception whereby reception occurs at a preset time as in the first and second embodiments can be combined with reception based on outdoor detection in the third embodiment. In this situation, if reception is successful at the scheduled time, operation can be controlled to not execute if a predetermined time has not passed since the successful reception even if an outdoor location is detected. Alternatively, if reception succeeds when an outdoor location is detected and the reception process runs, operation can be controlled to not execute the automatic reception process unless a predetermined time has passed since the successful reception, and if reception is successful once in a day, the reception process can be prevented from executing again the same day.

The reception condition can also be set so that the automatic reception process executes if the preset time has come and an outdoor location is detected. In this situation the probability of reception succeeding in the automatic reception process can be improved.

The timing of the automatic reception process in the first and second embodiments is not limited to the times described above, and other times may be used instead. A configuration enabling the user to set the automatic reception time is also conceivable. More particularly, if the user can set the automatic reception time, the time can be set to a time when reception is easiest based on the user's daily pattern, and the probability of successful reception can therefore be improved.

In the second and third embodiments operation is controlled to limit successful reception to once a day by determining if a predetermined time since the last successful reception has passed in S112 and S114. However, a history of whether reception succeeded or failed can be stored, this history can be checked, and if reception succeeds once in a day, the reception process can be prevented from executing again the same day.

For example, the reception history may be reset at midnight (0:00), and if reception then succeeds, a record of successful reception can be stored. The reception process can then be controlled to check the reception history when the reception process is invoked to confirm if reception has already been successful that day.

Each of the foregoing embodiments controls the automatic reception process to execute at least once a day, but the interval between automatic reception processes may be increased so that the automatic reception process executes once every other day, for example. This automatic reception process interval may be set appropriately according to the accuracy of the internal time, for example.

In the embodiments described above the high precision time adjustment process unit 54 executes the positioning process during manual reception, but a configuration enabling the user to select whether the simple time adjustment process unit 53 or the high precision time adjustment process unit 54 operates during manual reception is also conceivable. If processing by the simple time adjustment process unit 53 is selected for manual reception, the reception process can be completed in a short time, and convenience can be improved. This can improve convenience when there has been no movement between time zones and the reception process is manually invoked.

Each of the foregoing embodiments executes the simple time adjustment process by means of the simple time adjustment process unit 53 if GPS satellite 5 capture fails, if acquisition of orbit data fails, or if the positioning calculation fails when the high precision time adjustment process unit 54 executes the high precision time adjustment process, but the reception process may be aborted without running the simple time adjustment process.

The foregoing embodiments are described with reference to a GPS satellite as an example of a positioning information satellite, but the positioning information satellite of the invention is not limited to GPS satellites and can be used with Global Navigation Satellite Systems (GNSS) such as Galileo (EU), GLONASS (Russia), and Beidou (China), and other positioning information satellites that transmit satellite signals containing time information, including the SBAS and other geostationary or quasi-zenith satellites.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An electronic device, comprising:
   a receiver configured to receive a satellite signal;
   a time generator configured to generate time; and
   a processor configured to selectively execute an automatic reception process or a manual reception process;
   wherein the automatic reception process includes acquiring time information based on the received satellite signal and correcting the time based on the acquired time information without calculating the position of the electronic device, the automatic reception process being executed when a predetermined condition is satisfied,
   wherein the manual reception process includes calculating the position of the electronic device based on satellite orbit information and the received satellite signal, and correcting the time based on the calculated position, the manual reception process being executed based on manual operation.

2. An electronic device as recited in claim 1, further comprising:
   a display configured to display time based on the corrected time;
   wherein the predetermined condition includes that the display time has reached a preset reception time.

3. An electronic device as recited in claim 1, further comprising:
   a solar powered generator;
   wherein the predetermined condition includes that an output from the solar powered generator is greater than or equal to a predetermined level.

4. An electronic device as recited in claim 1, further comprising:
   an ultraviolet sensor;
   wherein the predetermined condition includes that an output from the ultraviolet sensor is greater than or equal to a predetermined level.

5. An electronic device as recited in claim 1, further comprising:
   a display configured to display time based on the corrected time; and
   a solar powered generator;
   wherein the predetermined condition includes that the display time has reached a preset reception time and an output from the solar powered generator is greater than or equal to a predetermined level.

6. An electronic device as recited in claim 1, further comprising:
   a memory that stores position information and time difference information corresponding to the calculated position;
   wherein the manual reception process further includes accessing the memory to acquire time difference information corresponding to the calculated position, and the correcting of the time is further based on the acquired time difference information.

7. An electronic device as recited in claim 1, wherein the electronic device is a wristwatch.

8. An electronic device as recited in claim 1, wherein the electronic device is a wristwatch that has a crown or a button for the manual operation.

* * * * *